United States Patent [19]

Butler

[11] 4,211,259

[45] Jul. 8, 1980

[54] PLASTIC TUBE

[76] Inventor: James L. Butler, Westlake Village, Calif.

[21] Appl. No.: 896,343

[22] Filed: Apr. 14, 1978

[51] Int. Cl.² ............................................ F16L 47/02
[52] U.S. Cl. .................................... 138/109; 138/155
[58] Field of Search .................... 138/109, 99, 155; 285/294, 297, DIG. 16, 93, 3, 4; 156/305, 294; 277/1

[56] References Cited

U.S. PATENT DOCUMENTS

| 3,847,694 | 11/1974 | Stewing | 156/305 |
| 4,049,480 | 9/1977 | Kutschke | 138/99 |
| 4,073,402 | 2/1978 | Wood | 285/3 |

Primary Examiner—Lenard A. Footland

[57] ABSTRACT

A plastic (polyvinylchloride-PVC) pipe is provided which is shaped to receive the end of an adjacent pipe such that the two pipes may be joined together by a tight adhesive seal in a simple and expeditious manner. In accordance with the invention, an internal peripheral channel is provided adjacent to one end of the pipe. The channel is displaced inwardly from the end of the pipe, and is entirely covered by the end of a second pipe, when that end is inserted into the first pipe. An entrance port for the channel is provided which extends through the first pipe into the channel. This port is preferably shaped to receive the nose of an adhesive gun which is used to inject adhesive through the entrance port into the peripheral channel. The adhesive used may be any appropriate adhesive, such as presently is being used to bond plastic pipes to one another. An exit port is provided which is angularly displaced from the entrance port, and which extends from the channel through the first pipe. The exit port is initially covered with a rupturable plastic film, the film being pierced to permit air in the channel to bleed out through the exit port as the adhesive is being injected into the entrance port and into the channel. The film withstands the pressure of the adhesive in the channel until the adhesive completely fills the channel and forms a firm bonding ring extending around the outer peripheral surface of the inserted end of the second pipe. The film ruptures when the pressure of the adhesive injected into the channel is such that the channel is full of adhesive in firm engagement with the inserted end of the second pipe, and a quantity of excess adhesive is discharged through the exit port. The operation is then terminated, and the adhesive in the channel is allowed to harden and form a firm bond between the two pipes.

5 Claims, 5 Drawing Figures

FIG. 1
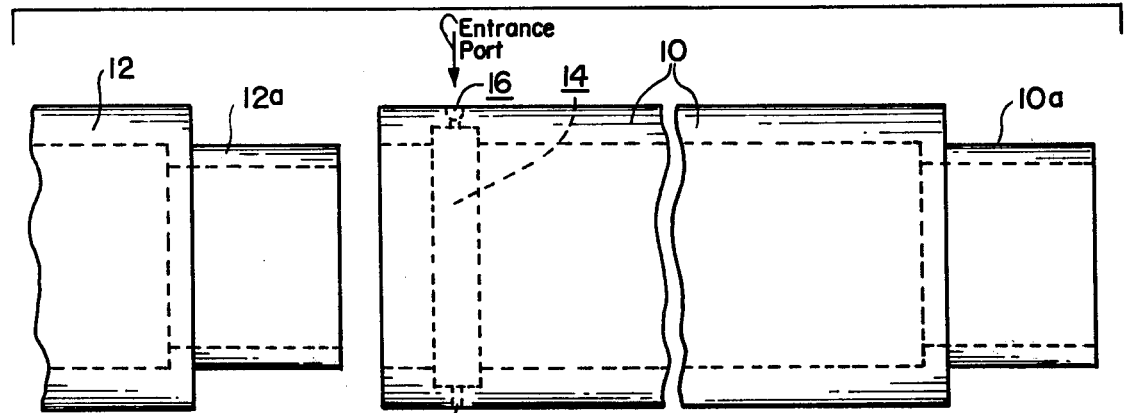
FIG. 2
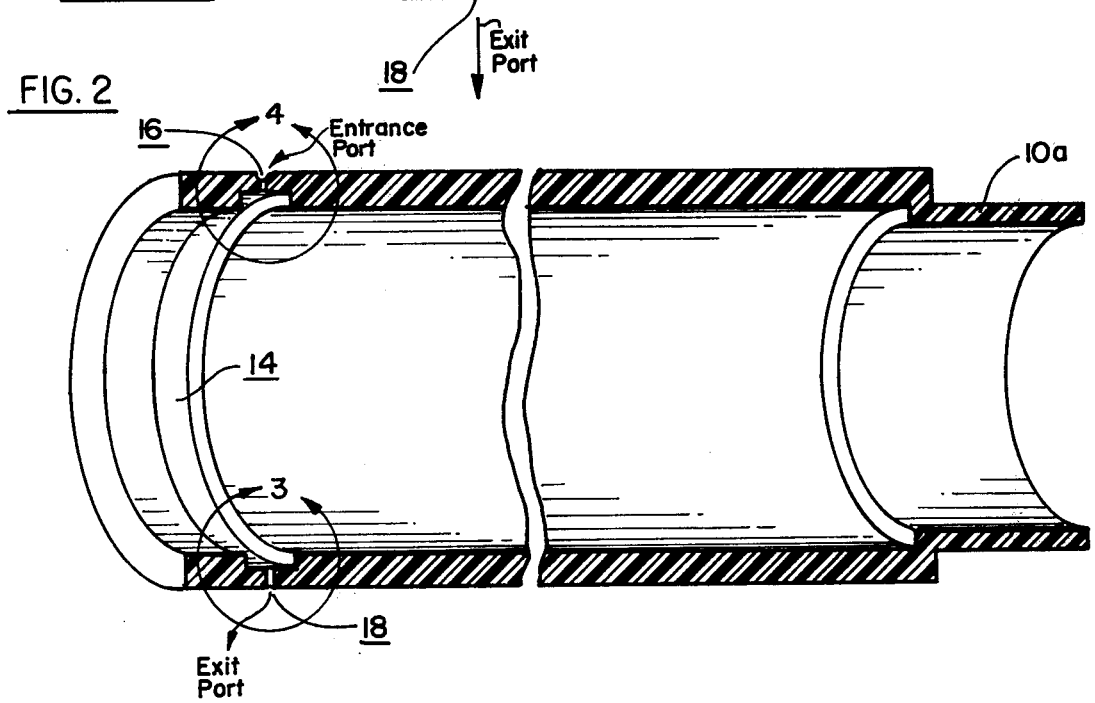
FIG. 4
FIG. 3
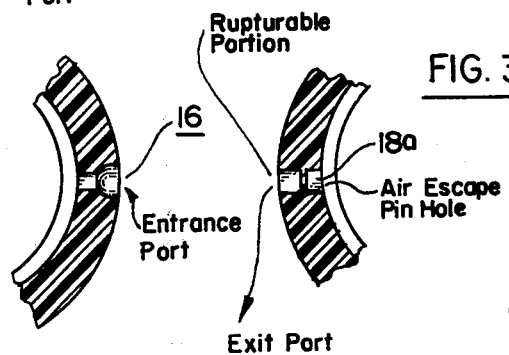
FIG. 5
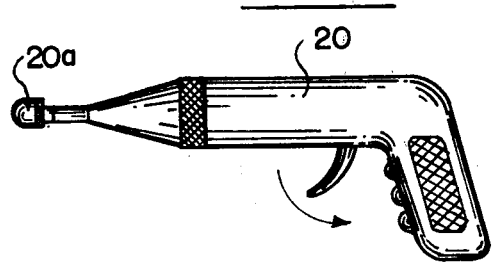

PLASTIC TUBE

BACKGROUND OF THE INVENTION

It is the usual practice in laying a plastic pipeline to apply the bonding adhesive to the end of one pipe, and then to insert that end into the end of a second pipe and, after the bond has formed, to move on to the next joint in the pipeline, and repeat the operation. This prior art approach, however, is awkward and time consuming.

In the practice of the present invention, the entire pipeline can be layed out with each length of pipe fitted into the adjacent pipe prior to the application of the adhesive. Then, a single worker may go from joint-to-joint with an adhesive gun, and quickly and efficiently inject the adhesive into each joint to cause each of the pipes in the pipeline to be bonded to the adjacent pipe. This is achieved, in each instance, merely by inserting the gun into the entrance port at the end of each length of pipe, injecting the adhesive through the entrance port into the internal channel, and continuing to inject the adhesive until it is discharged through the exit port.

As pointed out above, during each injection operation, a rupturable film in the exit port will remain in place until the pressure of the adhesive in the internal channel is high enough to assure that a complete ring of adhesive is forced firmly against the outer surface of the inserted end of the adjacent pipe. The film will then break permitting excess adhesive to flow out through the exit port. As also pointed out, this film is initially pierced, to provide a small air hole, so that all air within the channel may be caused to bleed out through the hole.

BRIEF DESCRIPTION OF THE DRAWINGS

FIG. 1 is a side elevation of two pieces of plastic pipe, which are configured in accordance with the concepts of the invention, so that they may be simply joined to another;

FIG. 2 is a perspective view of a longitudinal section of one of the pipes of FIG. 1;

FIG. 3 is an enlarged detail of a portion of the pipe of FIG. 2;

FIG. 4 is an enlarged section of another portion of the pipe of FIG. 2; and

FIG. 5 shows a typical gun which may be used to inject adhesive into the joint between the two pipes of FIG. 1.

DETAILED DESCRIPTION OF THE ILLUSTRATED EMBODIMENT

As shown in FIG. 1, two pieces of pipe 10 and 12 are provided which may be composed of appropriate plastic, such as polyvinylchloride (PVC). The pipe 10 has an internal peripheral channel 14 at one end thereof, with an entrance port 16 extending through the pipe into the channel, and with an exit port 18 extending from the channel through the pipe. The ports 16 and 18 are angularly spaced from one another and may, as illustrated, be diametrically opposed to one another.

The other end of pipe 10 has a reduced diameter 10A, as shown. Pipe 12 may be identical to pipe 10, and it too has an end 12A of reduced diameter.

The end 12A of pipe 12 is received in the left-hand end of pipe 10, so that the reduced section 12A may completely cover the internal channel 14.

As best shown in FIG. 4, the entrance port 16 may be shaped to receive the nose 20A of an adhesive gun 20. When the nose 20A is placed in the entrance port 16, a quantity of adhesive may be injected from the gun through the entrance port into the channel 14.

As best shown in FIG. 3, the exit port 18 is normally covered by a small integral film 18A. Film 18A is strong enough to withstand the force of the adhesive injected into the channel 14, until the adhesive has completely filled the channel and is forced firmly against the peripheral surface of the end 12A of pipe 12. At that time, the film breaks, and excess adhesive is discharged through the exit port 18. The worker may then terminate the operation.

Exit port 18 is provided with a small bleed hole, as stated above, to bleed out any air which may exist within the channel 14 during the injection operation.

As mentioned above, the concept of the present invention is most advantageous, since it permits the entire pipeline to be layed without any bonding operation, and then, with the pipeline in place, and without any need to raise or lower the individual pipes, a single worker may move from joint-to-joint, and perform the bonding operation, merely by injecting the adhesive through each entrance port 16, and continuing to inject the adhesive, until a quantity of the adhesive appears at the exit port 18.

It will be appreciated that while a particular embodiment of the invention has been shown and described, modifications may be made. It is intended in the claims to cover the modifications which come within the spirit and scope of the invention.

What is claimed is:

1. A pipe having an internal peripheral channel at one end thereof displaced inwardly from said end, an entrance port extending through said pipe into said channel to permit an adhesive to be injected into the channel through the port to form a ring of adhesive around the end of an adjacent pipe inserted into said one end of said first-named pipe to bond the first-named pipe and the adjacent pipe to one another, an exit port extending through said first-named pipe from said channel angularly displaced from said entrance port to permit excess adhesive to be discharged therethrough, and a rupturable film extending across the exit port to prevent discharge of the adhesive therethrough until a predetermined adhesive pressure is reached in the channel.

2. The pipe defined in claim 1, in which said film has a hole therein to bleed air from the channel as the adhesive is injected into the channel.

3. The pipe defined in claim 1, and which is composed of a plastic material.

4. The pipe defined in claim 3, and which is composed of polyvinylchloride (PVC).

5. The pipe defined in claim 1, in which the entrance port has a configuration to receive the nose of an adhesive injecting gun.